United States Patent [19]

Tani et al.

[11] Patent Number: 5,527,871
[45] Date of Patent: Jun. 18, 1996

[54] LAYERED INORGANIC-ORGANIC POLYMER SHAPED ARTICLE THEREOF AND PROCESS FOR PRODUCING THE SAME

[75] Inventors: Masaaki Tani; Yoshiaki Fukushima; Akane Okada; Katsuya Mizutani, all of Aichi, Japan

[73] Assignee: Kabushiki Kaisha Toyota Chuo Kenkyusho, Aichi-ken, Japan

[21] Appl. No.: 422,606

[22] Filed: Apr. 12, 1995

Related U.S. Application Data

[63] Continuation of Ser. No. 174,416, Dec. 28, 1993, abandoned.

[30] Foreign Application Priority Data

Dec. 28, 1992 [JP] Japan .................................. 4-360551
Nov. 4, 1993 [JP] Japan .................................. 5-275518

[51] Int. Cl.⁶ .................................................. C08G 77/00
[52] U.S. Cl. ................... 528/10; 528/9; 528/39; 528/395; 423/89; 423/325; 423/331; 423/618
[58] Field of Search .................... 528/9, 10, 39, 528/395; 423/325, 331, 89, 618

[56] References Cited

U.S. PATENT DOCUMENTS

| | | | |
|---|---|---|---|
| 4,298,723 | 11/1981 | DiGiacomo et al. | 528/9 |
| 4,800,122 | 1/1989 | Sallavanti et al. | |
| 5,068,216 | 11/1991 | Johnson et al. | 423/331 |
| 5,130,397 | 7/1992 | Zeigler | 528/9 |

OTHER PUBLICATIONS

Hackh's Chemical Dictionary, McGraw–Hill Book Co. NY., 1972, pp. 334–335.
Japan Abstract, AN–60–217396, Sep. 30, 1985, JP–A–62–074957, Apr. 6, 1987.
Japan Abstract, AN–01–295221, Nov. 13, 1989, JP–A–03–153519, Jul. 1, 1991.
Japan Abstract, AN–01–340533, Dec. 27, 1989, JP–A–03–199118, Aug. 30, 1991.

*Primary Examiner*—Melvyn I. Marquis
*Attorney, Agent, or Firm*—Oblon, Spivak, McClelland, Maier & Neustadt

[57] ABSTRACT

A layered inorganic-organic polymer having the features of both inorganic and organic materials and a coating material produced therefrom. The former is produced, for example, by reacting an organoalkoxysilane having alkoxyl groups and organic groups with a metal salt or alkoxide in an alkaline solution. This reaction yields a layered inorganic-organic polymer composed of one or two sheets of tetrahedrons with a central atom of Si or a metal and a sheet of octahedrons with a central atom of a metal, part or all of the central atoms of the tetrahedrons being covalently bonded to organic groups. If the organic group is one which contains a functional group capable of polymerization, the resulting layered inorganic-organic polymer may be polymerized with a functional group to give a firm coating material. The functional group of the organic group may be bonded to an organic compound. The layered inorganic-organic polymer has both the features of inorganic materials such as high hardness and good heat resistance and the features of organic materials such as flexibility and sheet formability at room temperature. In addition, it has good affinity for organic solvents and organic substances.

18 Claims, 6 Drawing Sheets

TETRAMETHYLORTHOSILICATE (TMOS)
−79

3-METHACRYLOXYPROPYLTRIMETHOXYSILANE (MPTS)
−43

TMOS CLAY

ACRYL-Mg HYBRID CLAY

3-METHACRYLOXYPROPYLTRIMETHOXYSILANE

ACRYL-Mg HYBRID CLAY

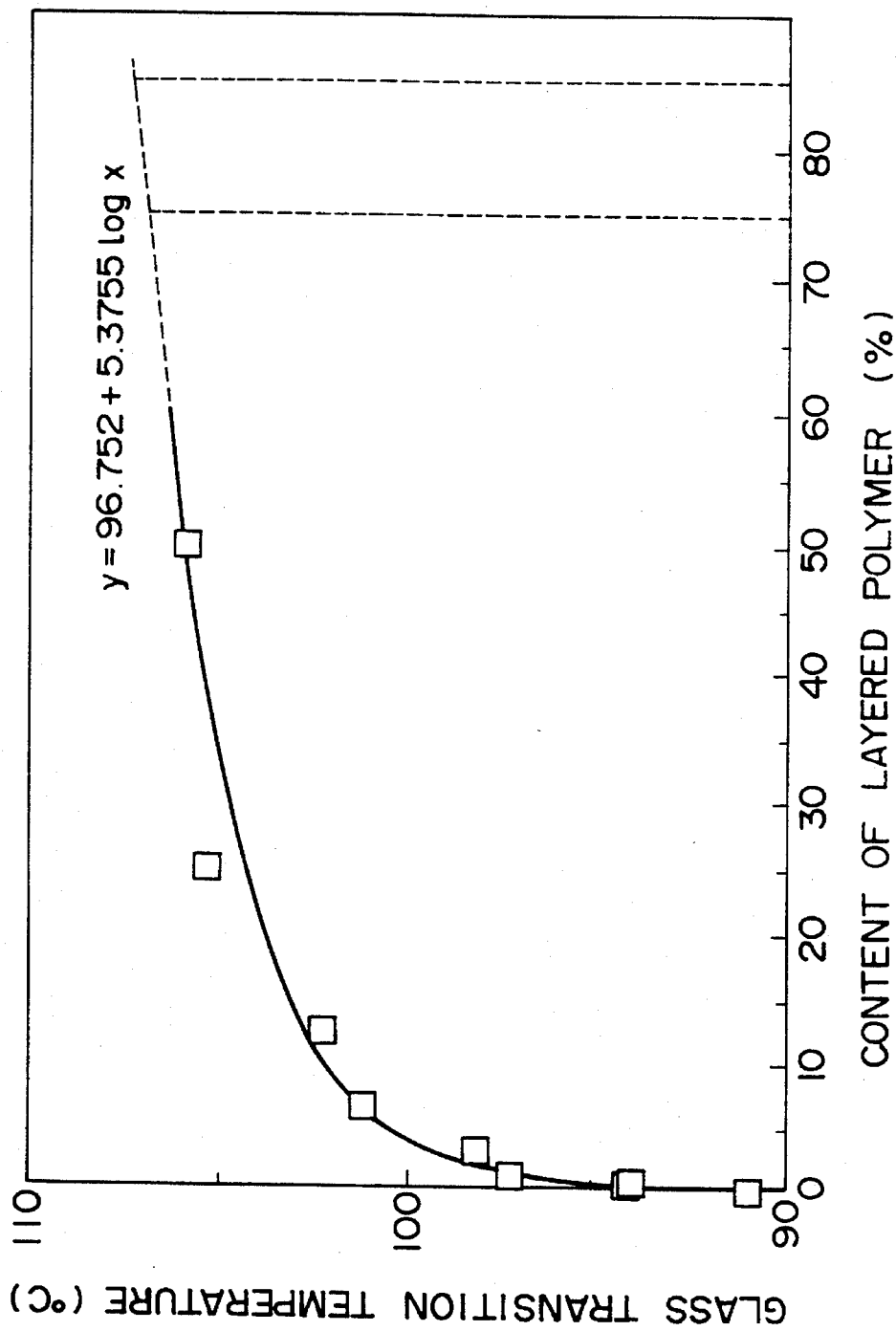

LAYERED INORGANIC-ORGANIC POLYMER SHAPED ARTICLE THEREOF AND PROCESS FOR PRODUCING THE SAME

This application is a continuation of application Ser. No. 08/174,416, filed on Dec. 28, 1993, now abandoned.

BACKGROUND OF THE INVENTION

1. Field of the Invention

The present invention relates to a layered inorganic-organic polymer, a shaped article thereof and a process for producing the same, and more particularly to a layered inorganic-organic polymer to be used as a coating material, a filler for resins, various kinds of high-performance materials, etc., a shaped article thereof in various forms, such as layered coating, produced for specific purposes by reaction and bonding of the organic portions of the polymer, and a process for producing the layered inorganic-organic polymer and shaped article thereof.

2. Description of the Related Art

An inorganic material as a coating material, a principal component of shaped article, or a filler is usually characterized by high hardness and good heat resistance. However, it has a disadvantage of requiring calcination in the course of processing from a liquid phase or solution into a dense solid phase. Another disadvantage of such an inorganic material is a weak affinity for organic solvents and organic materials. On the ether hand, an organic material is characterized by good flexibility and sheet formability at room temperature. However, it is poor in hardness and heat resistance. For these reasons, there has been a demand for an inorganic-organic hybrid material having features of both inorganic and organic materials, with their disadvantages suppressed to a possible extreme, and also for an effective process for producing such a material under mild conditions, for example, at room temperature.

There are some technologies developed to meet such a demand. They include an inorganic-organic hybrid paint as disclosed in U.S. Pat. No. 4,800,122. It is a wear-resistant coating material which is composed of a reaction product of a partial hydrolyzate of epoxy-silane, a carbonyl group-containing compound, and an aliphatic polyamine (excluding silane derivatives). However, it is not remarkably superior to an organic polymer in hardness and heat resistance, because it does not permit the inorganic structure to be fully introduced into the organic polymer, nor does it permit the portion of inorganic structure to grow in the coating film on account of the organic reactions that take place at room temperature.

One of the present inventors disclosed in Japanese Patent Laid-open No. 74957/1987 an ion-exchanged clay as an inorganic-organic hybrid material (an intercalation compound composed of a layered clay mineral with an organic compound sandwiched therebetween by ion exchange reaction). Though the ion-exchanged clay is exceedingly effective in achieving the purpose of that invention, it is not sufficiently suitable for the technical field to which the present invention is to be applied. The disclosed ion-exchanged clay suffers several disadvantages with ion exchange reaction, it is impossible to introduce organic compounds, such as those containing epoxy groups or terminal amino groups. Moreover, it is only possible to introduce organic compounds up to the ion exchange capacity peculiar to the clay mineral. The intercalation compound, in which a clay mineral and an organic compound are held together simply by an ionic bond, is liable to liberate the organic compound when the ion bond is broken during use.

SUMMARY OF THE INVENTION

It is an object of the present invention to provide an inorganic-organic hybrid material in which an inorganic portion is fully grown, a sufficient amount of organic substance is introduced, and there is formed a firm bond between the organic portion and the inorganic portion.

It is another object of the present invention to provide an inorganic-organic hybrid material composed of an inorganic portion and an organic portion whose ratio can be controlled easily.

It is a further object of the present invention to provide a process for producing efficiently the inorganic-organic hybrid material under mild conditions harmless to the organic portion, and a process in which there is no strict restrictions on the organic substances to be introduced and even those which are not readily ionized can be easily introduced.

It is a further object of the present invention to provide a shaped article of the inorganic-organic hybrid material, considering its practical use as a coating material, a filler, etc., in which the inorganic portion fully grown and the sufficient amount of organic substance are efficiently utilized to form a firm and minute solid phase.

It is still a further object of the present invention to provide a process for producing the shaped article under mild conditions harmless to the organic portion.

To achieve the above-mentioned objects, the present inventors paid attention to a layered clay-like structure (phillosilicates), as an inorganic portion of the inorganic-organic hybrid material, having excellent heat resistance and formability, and attempted to realize a structure in which organic groups are bonded through the Si-C covalent bond on the layered clay mineral.

By the way, it is difficult to introduce into a completed layered clay mineral organic groups to be covalently bonded to Si. On the other hand, introducing such organic groups into a layered clay mineral during its synthesis will cause the organic groups directly bonded to part of the tetrahedrons. In this case, it has been commonly believed that neither the sheet of tetrahedrons nor the structure of a layered clay mineral can be formed due to the lack of the number of bonds. However, the present inventors have found that the above structure can be actually realized contrary to the common knowledge and thus have completed the present invention.

The inorganic-organic hybrid material is superior in heat resistance and hardness to organic materials and is also superior in flexibility to inorganic materials. According to the present invention, it is also possible to control the ratio of the inorganic and organic portions to impart higher flexibility by adding more organic groups to the inorganic-organic hybrid material.

The first aspect of the present invention resides in a layered inorganic-organic polymer which comprises one or two sheets of tetrahedrons, with its central atom being Si or a metal, and a sheet of octahedrons, with its central atom being a metal, which are laminated to form a layered clay-like structure, wherein part or all of the tetrahedrons have their central atoms (Si or metal) covalently bonded to organic groups.

The second aspect of the present invention resides in a process for producing the layered inorganic-organic polymer defined above in the first aspect of the present invention, the process comprising dissolving or dispersing the following components (a) and (b), and optionally the components (c) and (d), in the component (e), and adding an alkali to the resulting solution to make it alkaline, optionally followed by aging:

(a) at least one compound selected from (1) Si compounds containing Si having at least one alkoxyl group and covalently bonded to at least one organic group; (2) Ge compounds containing Ge having at least one alkoxyl group or halogen and covalently bonded to at least one organic group; and (3) Si-Ge compounds containing Si having at least one alkoxyl group and covalently bonded to at least one organic group, and also containing Ge having at least one alkoxyl group or halogen and covalently bonded to at least one organic group;

(b) at least one compound selected from inorganic salts, organic salts and alkoxides of at least one metal selected from Mg, Al, Ni, Co, Cu, Mn, Fe, Li, V, and Zr;

(c) at least one compound selected from silicon alkoxides having at least one alkoxyl group, germanium alkoxides having at least one alkoxyl group, and germanium halides;

(d) at least one compound containing P; and (e) an inorganic or organic polar solvent, or a mixture of two or more polar solvents.

The third aspect of the present invention resides in a shaped article of the above-defined layered inorganic-organic polymer in which the layered inorganic-organic polymer having functional groups on its organic groups is shaped into a particular form, and the organic groups are bonded to each other by polymerization reaction of its functional groups. Here and throughout the specification, the polymerization reaction between organic groups means an intermolecular bond which occurs between organic groups in adjacent but separate layered inorganic-organic polymers. An intramolecular bond may also occur between two adjacent organic groups in one layered inorganic-organic polymer.

The fourth aspect of the present invention resides in a shaped article of layered inorganic-organic polymer as defined above in the third aspect of the present invention in which the functional groups on the organic groups are bonded to organic compounds. Part of the organic groups may be bonded to other organic groups as defined above in the third aspect of the present invention. Here, an organic group may have more than two functional groups, one of which may be subjected to polymerization reaction and the other of which may be bonded to an organic compound.

If the amount of the organic compound added is large, the layered inorganic-organic polymer functions as a filler dispersed in the organic compound as a matrix. In this case, the layered inorganic-organic polymer and the organic compound as a matrix are covalently bonded to each other. Therefore, unlike usual fillers, increased heat resistance (e.g. the rise of glass transition temperature), and high hardness, strength and rigidity (due to the three dimensional cross-linking structure), etc. are expected.

The fifth aspect of the present invention resides in a process for producing the shaped article of layered inorganic-organic polymer as defined above in the third aspect of the present invention, which comprises imparting a desired specific shape to the layered inorganic-organic polymer and performing polymerization reaction on the functional groups of the organic groups, thereby bonding the organic groups to each other.

The sixth aspect of the present invention resides in a process for producing the shaped article of layered inorganic-organic polymer as defined in the fourth aspect of the present invention, which comprises imparting a desired specific shape to the layered inorganic-organic polymer and bonding functional groups of the organic groups to the organic compounds. Here, organic groups may undergo polymerization reaction.

BRIEF DESCRIPTION OF THE DRAWINGS

FIG. 8 is a graph showing how the content of the layered polymer affects the glass transition temperature.

DETAILED DESCRIPTION OF THE INVENTION

The first aspect of the present invention will be described in detail below.

The layered inorganic-organic polymer is available in two types: that of 2:1 type in which one sheet of octahedrons is sandwiched between two sheets of tetrahedrons, and that of 1:1 type in which one sheet of octahedrons and one sheet of tetrahedrons are arranged back to back. The former is preferable to the latter in the case where the polymer is to contain more organic groups or to have an increased bond strength between organic groups.

Figure 1:
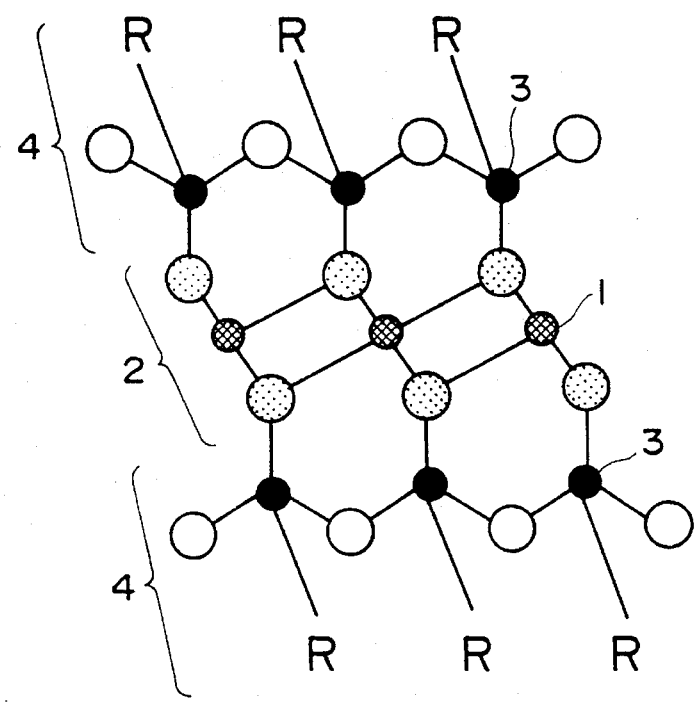
FIG. 1 is a schematic representation of the structure of the layered inorganic-organic polymer.

FIG. 1 shows a partial structure of a layered inorganic-organic polymer of 2:1 type. (The central atom of the tetrahedron is Si and each Si has one organic group attached thereto.). There is shown a sheet of octahedrons 2, having metal atoms 1 in its center. There are shown two sheets of tetrahedrons 4, each having Si atoms 3 in its center. The former sheet is sandwiched between the latter sheets. The Si atoms 3 have organic groups (R) covalently bonded thereto. The organic groups (R) constitute part of the sheet of tetrahedrons 4.

The central atoms of the tetrahedrons constituting the sheet are Si, or they may be replaced partly or entirely by Al, Fe, Ge or P. The central atoms of the octahedrons consist of one or more metal atoms selected from Mg, Al, Ni, Co, Cu, Mn, Fe, Li, V and Zr.

In this specification, the term "organic groups" does not include an alkoxyl group. Organic groups that can be used in the present invention are those which can be introduced into the layered inorganic-organic polymer and which can impart the characteristics of organic materials to the polymer. They may or may not contain functional groups. One to three organic groups are convalently bonded to part or all of the central atoms of the tetrahedrons.

The first aspect of the present invention has the following functions and effects.

The layered inorganic-organic polymer has its inorganic portion in the form of layered clay-like structure composed of one or two sheets of tetrahedrons (whose central atom is Si or a metal) and a sheet of octahedrons (whose central atom is a metal). Therefore, it exhibits the properties of inorganic materials such as hardness and good heat resistance.

The central atoms (which are Si or metals) of the tetrahedrons are partly or entirely bonded to organic groups. This means that it is possible to introduce a sufficient amount of organic portions, i.e. one to three organic groups per each central atom of the tetrahedrons. Therefore, the polymer as an organic coating material exhibits good flexibility and sheet formability at room temperature, which are the characteristics of organic materials. Further, the polymer has good affinity for organic solvents or organic materials.

The covalent bond between a central atom of the tetrahedrons and an organic group is strong enough to withstand any chemical processing for practical use (such as mixing with other components) which will be encountered when the layered polymer is used as a coating material.

The second aspect of the present invention will be described in detail as follows:

The component (a) having either Si or Ge or both Si and Ge provides central atoms and organic groups in the sheet of tetrahedrons in the layered inorganic-organic polymer. An example of the compound having Si is one which has at least one alkoxyl group and at least one organic group (the former is necessary for Si as a central atom in the sheet of tetrahedrons to bond to the sheet of octahedrons). Accordingly, the ratio of alkoxyl groups to organic groups ranges from 3:1 to 1:3.

An inorganic or organic salt of a metal in the component (b) provides central atoms of the octahedrons constituting the sheet in the layered inorganic-organic polymer. The metal to be used is at least one selected from Mg, Al, Ni, Co, Cu, Mn, Fe, Li, V and Zr. There are no restrictions on the kind of inorganic or organic acids which form salts with a metal. The metals may be partly replaced by the central atoms of the sheet of tetrahedrons during the practice of the present invention.

A silicon alkoxide, a germanium alkoxide, a germanium halide or a mixture thereof in the component (c), may be optionally used together with the component (s) (a) to control the content of organic groups in the layered inorganic-organic polymer. For example, silicon alkoxides includes one which has at least one alkoxyl group and has no organic groups on it. Therefore, the silicon alkoxide may have one to four alkoxyl groups and have no organic groups.

The component (d), which is a phosphorus compound, provides phosphorus to replace part of the central atoms of the sheet of tetrahedrons.

The ratio of the component (a) to the component (b) or the ratio of the components (a), (c) and (d) to the component (b) should be properly established so as to selectively produce the layered inorganic-organic polymer of 2:1 type or 1:1 type. In short, the ratio of metal atoms (as the central, atoms of the octahedrons) to the central atoms of the tetrahedrons has to be controlled.

For example, with a metal-to-Si ratio in the range of 1:0.5 to 1:1, the layered inorganic-organic polymer of 1:1 type will be formed. With a metal-to-Si ratio in the range of 1:2 to 3:4, the layered inorganic-organic polymer of 2:1 type will be formed.

The component (e) is an inorganic polar solvent (such as water and inorganic acid) or an organic polar solvent (such as alcohol, acetone and organic acid) or a mixture thereof.

It is not always necessary that the components (a) and (b) (and the optional components (c) and (d)) be completely dissolved in the component (e) as a solvent, but they may stay in the state of dispersion.

There are no strict restrictions on the kind of alkalis to be added to the solution or the dispersion. The pH value controlled by the amount of the alkali added is, for example, pH 8–10, although it cannot be uniformly regulated depending on the raw materials employed. In short, the alkalinity should be high enough to bring about gelation (or crystallization of the layered inorganic-organic polymer) at a reasonable rate but low enough to avoid damage to the organic groups. Gelation may take place at room temperature; but it may be carried out at higher temperature harmless to the organic groups.

Gelation may occur instantaneously or may take a few days, depending on the raw materials and the reaction conditions employed. After gelation, the resulting layered inorganic-organic polymer in crystalline form may be used as a coating material in the form of gel or may be obtained in the form of powder after solvent removal and drying.

The second aspect of the present invention has the following functions and effects.

According to the second aspect of the present invention, it becomes possible to introduce organic groups by the Si—C covalent bond to the Si atoms constituting the sheet of tetrahedrons of the layered clay-like structure.

The mechanism by which the layered inorganic-organic polymer is synthesized in the present invention has not been fully elucidated, but the followings presumably take place when organoalkoxysilane is used as a component (a), for example. Namely, as the components (a), (b), and optionally (c) and (d) are dissolved or dispersed in the solvent (e) and made alkaline, crystals of the sheet of octahedrons (each having a metal as a central atom) first grow. Subsequently, the Si atoms of organoalkoxysilane bond to the sheet of octahedrons by condensation after the hydrolysis of the alkoxyl groups. Each Si atom functions as a center from which the crystals of the sheet of tetrahedrons grow. This mechanism suggests that the sheets of Si tetrahedron are formed following the formation of the sheet of octahedrons even though part of the Si tetrahedrons have organic groups bonded directly thereto, to finally form a layered inorganic-organic polymer.

A component (c) such as a silicon alkoxide or the like may be contained similarly to a component (a) such as an organoalkoxysilane. Since the former does not contain any organic groups, it is possible to control the ratio of organic groups in the layered inorganic-organic polymer by using the component (c) and component (a) in a prescribed ratio.

In addition, no ion exchange reactions are employed in the introduction of organic groups, it is possible to introduce those organic groups (containing an epoxy group or a terminal amino group) which are not readily ionized. The second aspect of the present invention is based on the process (disclosed in Japanese Patent Laid-open No. 199118/1991) which is designed to produce phyllosilicate (layered clay-like structure) easily under mild conditions. Therefore, it excludes the possibility that the organic groups are damaged by high temperature or extreme alkalinity.

The component (a) and component (c) should be used in a controlled amount so that the resulting layered inorganic-organic polymer contains the organic groups in a controlled amount. Furthermore, in this way the layered inorganic-organic polymer is controlled in the degree of exhibiting its organic properties and affinity as desired.

The third aspect of the present invention will be described in detail as follows:

The functional group of organic groups embraces an unsaturated bond as a typical example; however, it also includes any functional groups which undergo polymerization reaction. It may be a combination of two functional groups such as an amino group and a carboxyl group, which forms an amide group. Except for the foregoing, the third aspect may be embodied in the same manner as the first aspect.

The third aspect of the present invention has the following functions and effects.

The shaped article in the third aspect has all the features which the layered inorganic-organic polymer in the first aspect has. Furthermore, the shaped article has increased hardness and heat resistance because the organic groups therein are bonded to each other through polymerization reaction on functional groups. In the case where the shaped article is in the form of film (as a coating material), the layered inorganic-organic polymer exhibits outstanding properties because of its layered structure in which dense inorganic sheets are bonded to each other by organic groups.

The fourth aspect of the present invention will be described in detail as follows:

The organic group in the fourth aspect has the same functional groups as mentioned in the third aspect bonded to an organic compound. The organic compound to be added may be an unpolymerizable compound or a polymerizable monomer or a polymer. There are two cases where the polymer is bonded to an organic group after having been polymerized, and where the monomer put into the process is bonded to the organic group while being polymerized.

The organic compounds to be bonded to a functional group of an organic group includes the following: an organic compound with a vinyl, acrylic or methacryl group or a polymer polymerized therefrom, which bonds to a vinyl, acryl or methacryl group as a functional group; an organic compound with a carboxyl or epoxy group or a polymer polymerized therefrom, which bonds to a functional group such as an amino, mercapto or p-hydroxyphenyl group; an organic compound with an epoxy, amino or carboxyl group, an organic compound with a mercapto or p-hydroxyphenyl group, etc., with a hydroxyl group on their end or a polymer polymerized therefrom, which bonds to an epoxy group as a functional group. Here the functional groups of an organic group may be bonded to each other by polymerization reaction as defined in the third aspect of the present invention.

Other structural conditions are the same as in the first and third aspects of the present invention, but a preferred structure is as follows.

The shaped article in the fourth aspect has a crystalline layered structure in which one or two sheets of tetrahedrons and a sheet of octahedrons are laminated to form a layered clay-like structure. The central atom of the tetrahedrons is at least one member selected from Si and Ge. The central atom of the octahedron is at least one metal atom selected from Mg, Al, Ni, Co, Cu, Mn, Fe, Li, V, and Zr. The layered structure manifests itself as 2:1 type, in which one sheet of octahedrons is sandwiched between two sheets of tetrahedrons, or 1:1 type, in which one sheet of octahedrons and another sheet of tetrahedrons are arranged back to back. The former is preferable in the case where more organic groups are to be contained or organic groups are to be mutually bonded more firmly.

Either type of structure, i.e. the 2:1 type or 1:1 type, is produced by controlling the ratio of atoms constituting the sheets of tetrahedrons and the sheet of octahedrons.

Part of the central atoms (at least one of Si and Ge) constituting the sheets of tetrahedrons may be replaced by at least one atom of Al, Fe and P. Thus, these metals, Al, Fe and P are easily introduced due to such replacement.

Organic groups (part or all of which have functional groups) are covalently bonded to the central atoms constituting the sheet of tetrahedrons. It is possible to introduce as many as one to three organic groups per central atom of the tetrahedron.

The organic group introduced is bonded to an organic compound, both of which constitute an organic portion of a shaped article. Here, in the case where an organic compound with one organic group bonded thereto is bonded to an organic group of another layered inorganic-organic polymer, there occurs a firm bond between two layered inorganic-organic polymers. In other words, the organic compound links the layered inorganic-organic polymers three dimensionally, thereby making it possible to improve physical properties of organic portions, such as heat resistance (the rise in glass transition temperature) and resistance to solvents. Therefore, the shaped article exhibits its organic and inorganic properties in varied degrees depending on the ratio of the organic compound to the layered polymer.

In the case where the shaped article is used for coating, it may exhibit its organic properties more explicitly, such as good flexibility and sheet formability at room temperature. It also may exhibit good affinity for organic solvents and organic materials even with a higher ratio-of inorganic portion.

The shaped article in the fourth aspect is constructed such that the organic groups are covalently bonded to the atoms constituting the sheet of tetrahedrons. Therefore, the inorganic portion and the organic portion are firmly bonded to each other. Their bond is not broken even when the shaped article undergoes mixing with other components and other processes during its practical use.

The shaped article has a larger number of organic groups than the conventional clay-hybrid materials. Therefore, it is possible to improve the physical properties of the organic compound, such as heat resistance, by adding a very small amount of layered polymer. The amount of the polymer to be added to obtain a useful shaped article may range over 0% to under 100%, but preferably from 0.05 wt % to 85 wt %.

Of the shaped articles of the present invention, the following is preferable because it can be easily synthesized from an organoalkoxysilane (which is readily available as a silane coupling agent) and it has highly reactive organic groups. It is a shaped article having a crystalline layered structure, one sheet being composed of tetrahedrons and the other being composed of octahedrons, each tetrahedron being composed of a central atom of Si, organic groups covalently bonded to it (the organic groups having an amino, an epoxy, a mercapto, an acryl, a methacryl or a vinyl group), and each oxygen atoms surrounding it by tetrahedral arrangement, each octahedron being composed of a central atom of Mg and oxygen atoms surrounding it in a octahedral arrangement.

The organic groups may be bonded to each other by polymerization reaction on the functional groups as mentioned in the third aspect of the present invention. The polymerization reaction between the organic groups is an intermolecular bond which occurs between organic groups of adjacent but separate layered inorganic-organic polymers. An intramolecular bond which occurs between two adjacent organic groups in one layered inorganic-organic polymer may also occur.

The shaped article of the fourth aspect has the crystalline inorganic portion composed of one or two sheets of tetrahedrons and a sheet of octahedrons which are laminated to form a layered clay-like structure. The central atom of the tetrahedron has an organic group covalently bonded thereto. The functional group of the organic group is bonded to an organic compound thereby constituting an organic portion. Therefore, the organic portion and the inorganic portion are firmly bonded in the same manner as in the third aspect. If the organic portion is dominant, the inorganic portion imparts high hardness and good heat resistance to the organic portion. If the inorganic portion is dominant, the organic portion covers the inorganic portion, making the shaped article suitable for use as a coating material.

The shaped article of the fourth aspect may be produced in such a manner as to easily control the ratio of an organic portion to an inorganic portion. In other words, the ratio of the inorganic portion and the organic portion in a shaped article may be controlled by adjusting the amount of the organic compound or the amount of the alkoxysilane to be added in the mixing step in the manufacturing process of the layered polymer.

The shaped article of the fourth aspect is composed of an inorganic portion and an organic portion, the central atom constituting the sheets of tetrahedrons in the former is covalently bonded to an organic compound, which is bonded to an organic compound thereby constituting the latter. Thus the inorganic and the organic portions are bonded to each other more firmly than the conventional ones which resort to ionic bonding. This firm bonding prevents those two portions from separation during the processing and use.

The shaped article of the fourth aspect will have different properties (such as color, surface hydrophilicity or hydrophobicity, and dielectric constant) depending on the kind of the organic compound which constitutes the organic portion.

The fifth aspect of the present invention will be described in detail as follows:

The layered inorganic-organic polymer takes on any shape depending on the way of shaping, processing and its application of the shaped article of the third aspect of the present invention; it takes on the shape of film if it is used for coating and it takes on the shape conforming to a mold if it is molded. After shaping, the functional groups may undergo bonding which is initiated by heating or any other known means.

The functions and effects involved in preparation of the layered inorganic-organic polymer are the same as those in the second aspect. The subsequent step for bonding of an organic group and an organic compound is carried out rapidly under mild conditions harmless to the organic groups.

The shaped article pertaining to the fourth aspect is produced by a process which consists of a step of mixing individual components, a step of adjusting the pH of the mixture, thereby forming the crystalline layered structure of an inorganic portion, and a step of adding an organic compound to the layered polymer thereby bonding to each other.

The sixth aspect of the present invention will be described in detail as follows:

The following is a detailed description about a preferred process for producing the shaped article of the fourth aspect.

The process is designed to yield a shaped article composed of a crystalline layered structure consisting of one or two sheets of tetrahedrons and a sheet of octahedrons, which are bonded to each other, and an organic compound covalently bonded thereto. The tetrahedron has a central atom which is at least one kind of atom selected from Si and Ge, or those partly replaced by at least one kind of atom selected from Al, Fe, and P. The octahedron has a central atom which is at least one kind of atom selected from Mg, Al, Ni, Co, Cu, Mn, Fe, Li, V, and Zr. The central atom of the sheets of tetrahedrons is covalently bonded to an organic group whose functional group is bonded to an organic compound.

The inorganic-organic polymer is produced by the following steps: a step of mixing the following components (f), (g) and (h), and optionally, the components. (i) and (J); a step of adding an alkali to the mixture solution, thereby making the solution alkaline (which is followed by aging if necessary) and forming the layered inorganic-organic polymer composed of a crystalline layered structure consisting of one or two sheets of tetrahedrons and a sheet of octahedrons (with the central atom of the former being at least one kind of atom selected from Si and Ge originated from the component (f) or those being partly replaced by at least one kind of atom selected from Al and Fe originated from the component (g) or P originated from the component (h), and that of the latter being at least one kind of atom selected from Mg, Al, Ni, Co, Cu, Mn, Fe, Li, V, and Zr originated from the component (i)), and an organic group covalently bonded to the central atom of the sheets of tetrahedrons; and a step of mixing the layered inorganic-organic polymer and at least one organic compound, thereby bonding the organic group of the layered inorganic-organic polymer to the organic compound:

(f) at least one compound selected from (1) Si compounds containing Si having at least one alkoxyl group and covalently bonded to at least one organic group; (2) Ge compounds containing Ge having at least one alkoxyl group or halogen and covalently bonded to at least one organic group; and (3) Si—Ge compounds containing Si having at least one alkoxyl group and covalently bonded to at least one organic group, and also containing Ge having at least one alkoxyl group or halogen and group covalently bonded to at least one organic;

(g) at least one compound selected from inorganic salts, organic salts and alkoxides of at least one metal selected from Mg, Al, Ni, Co, Cu, Mn, Fe, Li, V, and Zr;

(h) an inorganic or organic polar solvent, or a mixture of two or more polar solvents;

(i) at least one compound containing P; and (j) at least one compound selected from silicon alkoxides having at least one alkoxyl group, germanium alkoxides having at least one alkoxyl group, and germanium halides.

The mixing step consists of dissolving the components (f) and (g), and optionally the components (i) and (j), in the component (h).

Examples of the component (f), which supplies atoms constituting the sheets of tetrahedrons, include organosilicic compounds having alkoxyl groups and polymerizable functional groups (such as organoalkoxysilane) and organogermanium compounds (such as organoalkoxygermanium).

Examples of the component (g), which supplies atoms constituting the sheet of octahedrons, include inorganic salts, organic salts, and alkoxides of at least one metallic element selected from Mg, Al, Ni, Co, Cu, Mn, Fe, Li, V, and Zr. Of these elements, Al and Fe constitute the sheet of octahedrons and may also partly replace the atom (Si or Ge) constituting the sheets of tetrahedrons. Examples of the component (h) include polar solvents such as water, alcohol, acetone, organic acids, inorganic acids, etc., which may be used alone or in combination with one another. It is not always necessary that the components (f) and (g) be completely dissolved in the solvent. They may stay in the state of dispersion.

It is possible to add the component (i) at the time of mixing. The P atoms in the component (i) partly replace the atoms (Si or Ge) constituting the sheets of tetrahedrons. Examples of the component (i) include a phosphoric acid, derivatives thereof and inorganic and organic salts of phosphorus. It is also possible to add the component (j) at the time of mixing. The component (j) takes part in the formation of the layered structure of the layered inorganic-organic polymer in the same manner as the component (f). Here in this specification, the alkoxyl group is not defined as an organic group. The component (j) supplies part of the Si or Ge atoms (as a central atom of the tetrahedron) which are not covalently bonded to the organic group having functional groups. When the component (j) is used in a specific proportion to the component (f), it is possible to control the ratio of the inorganic portion in the layered polymer.

The formation of the layered polymer is accelerated by making the mixture solution alkaline. The desired alkalinity is pH 8–10, which depends on the raw materials used. It should be in such a range that gelation takes place at a desired speed for the crystal growth of layered polymer and the organic groups involved are not adversely affected. This step may proceed at room temperature, but it may be carried out at higher temperature harmless to the organic group. This step of forming of the layered polymer may be completed instantaneously or may take a few days (for aging), depending on the raw materials and conditions employed. The resulting gel-like layered polymer should preferably be obtained in the form of powder after solvent removal and drying.

No elucidation has been made of the mechanism by which the layered structure is formed. Presumably, the reaction proceeds in several steps. As the solution or dispersion of the components (f), (g), (i), and (j) in the component (h) (or a polar solvent) is made alkaline, the crystals of octahedrons (each having a metal central atom) first grow. Subsequently, the Si or Ge atoms of organoalkoxysilane form octahedrons by condensation after hydrolysis of alkoxyl groups. These Si atoms or Ge atoms function as a center from which the crystalline layered structure constituted by sheet of tetrahedrons grows, thereby forming a layered structure of two kinds of sheets of tetrahedrons and octahedrons. Accordingly, it is suggested that even though the organic group is directly bonded to part of the sheets of Si or Ge tetrahedrons, the sheets of Si or Ge tetrahedrons are formed following the sheet of octahedrons. This eventually leads to the formation of an inorganic layered portion of the layered inorganic-organic polymer.

In the process for bonding an organic group to an organic compound, the layered inorganic-organic polymer is mixed with the organic compound, thereby bonding the organic group of the layered polymer to the organic compound.

The organic compound should be liquid at room temperature or after heating or soluble in a solvent so that it can be uniformly mixed with the layered polymer which is in the form of powder. Preferred examples of the organic compound include those which have acrylic groups, vinyl groups, or epoxy groups, or those which form polymers having terminal amino groups. The organic compounds are not always necessary to be low-molecular ones; but they may be polymers or oligomers. By controlling the amount of the organic compound, it is possible to control the ratio of the organic portion to the inorganic portion.

If the organic compound is liquid, it may be added as such to the layered polymer. If the organic compound is one which becomes liquid upon heating, its addition and mixing should be carried out in a hot bath. In case where above two types of organic compounds are admixed, it is necessary to use a solvent which both dissolves the organic compound and swells the layered inorganic-organic polymer.

The layered polymer may not disperse into the solvent immediately, depending on the organic compound and the solvent employed. In such a case, the dispersion may be accelerated by forced stirring or ultra-sonic mixing. If the organic compound is a monomer which is to be polymerized, a catalyst or an initiator for polymerization may be necessary. The organic compounds may be used in combination with pigments and/or plasticizers.

The thus obtained shaped article of layered inorganic-organic polymer is composed of an organic and an inorganic portions which are covalently bonded to each other, the former forming the surface and the latter forming the inside of the shaped article. It is in this aspect that it differs from the conventional composite materials, such as FRP, in which a synthetic resin and an inorganic material are merely mixed together without any chemical bonds. It also differs from clay-hybrid composite materials in which clay particles are bonded to a resin containing organic ions. The ionic bonding between the clay and the resin is weaker than the covalent bond. On the contrary, in the shaped article of this invention, the covalent bond between the organic portion (forming the resin sheet) and the inorganic portion is much firmer than other bonds.

The process for producing the shaped article according to the sixth aspect of the present invention has the following functions and effects.

The process consists of the following steps: a step of dissolving prescribed raw materials in a polar solvent; making the solution alkaline thereby forming the layered polymer; and a step of adding an organic compound to the thus obtained layered polymer, thereby bonding them to each other. The ratio of the inorganic and the organic portions can be easily changed by adjusting the ratio of materials in the mixing or bonding step. The resulting shaped article with a controlled ratio of the organic and inorganic portions can be used as a coating material.

EXAMPLES

The invention will be described with reference to the following examples.

Example 1

(Preparation of acryl-Ni hybrid clay)

In 200 g of ion-exchanged water was dissolved 1.96 g of nickel chloride 6-hydrate. To the solution was added 2.73 g of 3-methacryloxypropyltrimethoxysilane diluted with 50 g of methanol. The solution was thoroughly stirred for 1 hour. To the solution was further added 16.5 ml of 1N aqueous solution of sodium hydroxide at a rate of 2 ml/min to form a gel. The gel was allowed to stand at room temperature for 2 days. The gel was filtered out, washed with water, and vacuum-dried. Thus there was obtained the desired acryl-Ni hybrid clay which is a layered inorganic-organic polymer.

Figure 2:
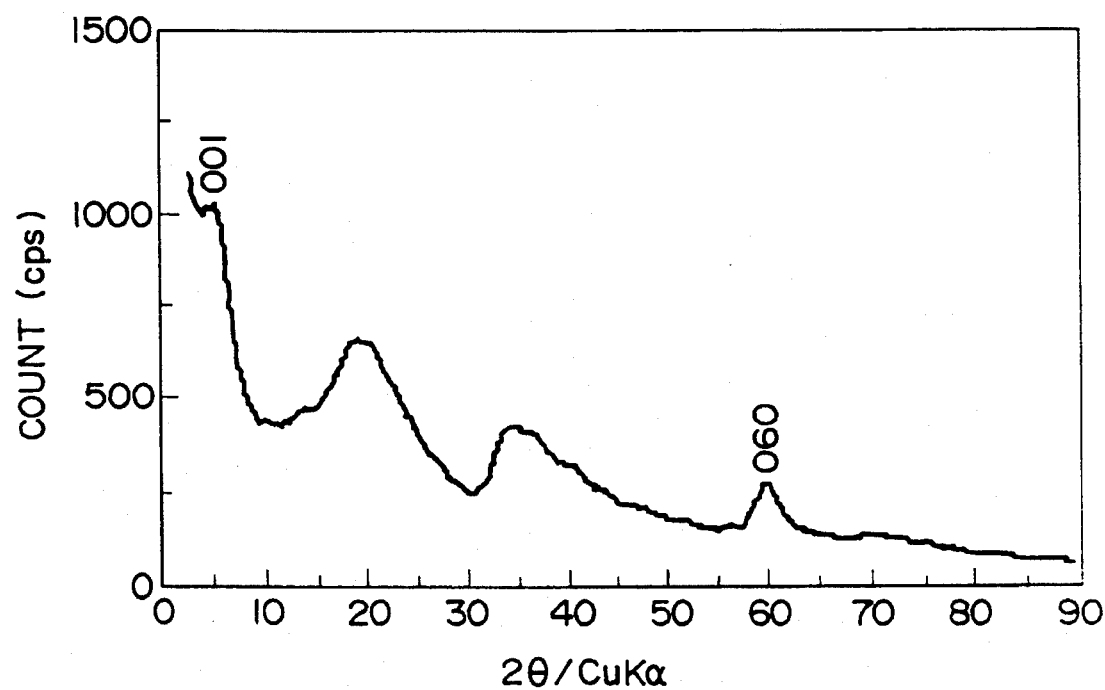
FIG. 2 is a graph showing an X-ray diffraction pattern of acryl-Ni hybrid clay.
Figure 3:
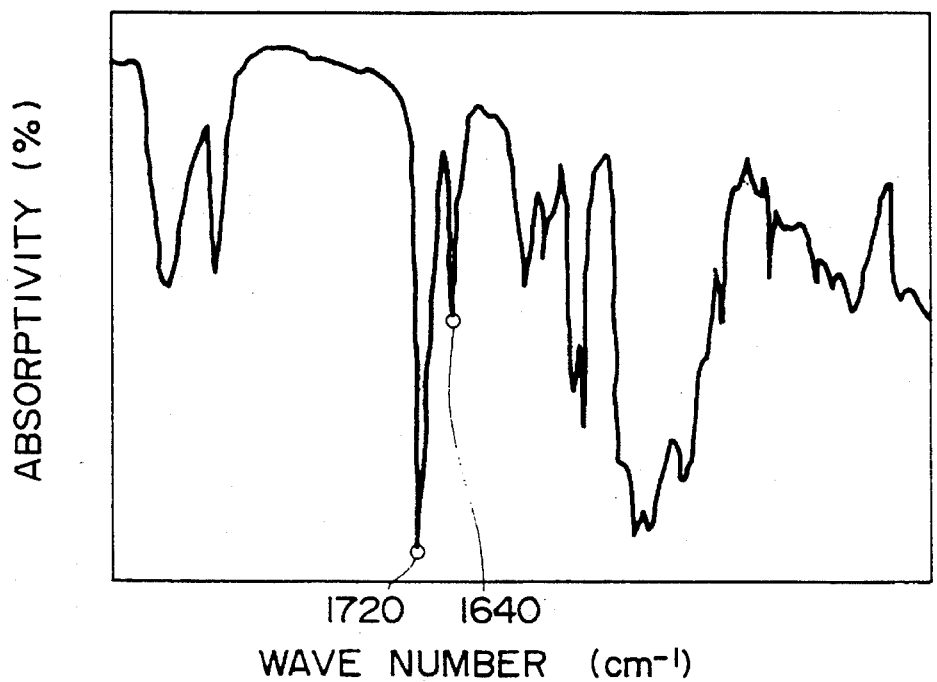
FIG. 3 is a graph showing an infrared absorption pattern of acryl-Ni hybrid clay.

The product was analyzed by X-ray diffractometry, the results of which are shown in FIG. 2. The pattern having the 001 peak is similar to that of smectite, which suggests the formation of a crystal structure. The product was also analyzed by infra-red spectroscopy, the results of which are shown in FIG. 3. The peaks of absorptivity at 1720 $cm^{-1}$ (due to a carbonyl group) and 1640 $cm^{-1}$ (due to a C=C double bond) suggest the presence of an acrylic group.

Figure 4:
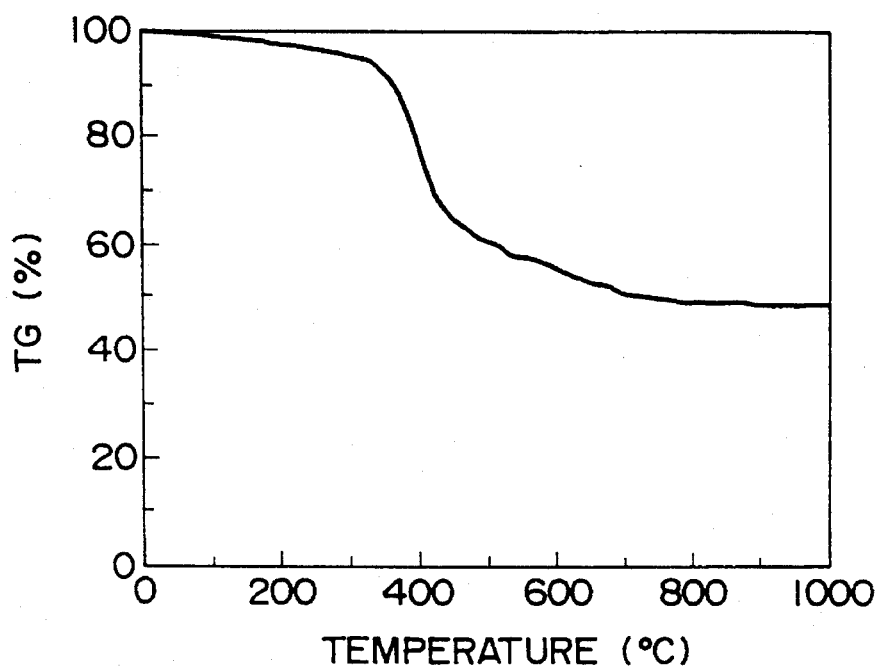
FIG. 4 is a graph showing thermogravimetry for acryl-Ni hybrid clay.

The product was further analyzed by thermogravimetry, the results of which are shown in FIG. 4. The fact that the weight remained almost constant until the temperature reached about 350° C. indicates that the organic groups in the layered inorganic-organic polymer have good heat resistance.

Example 2

(Preparation of acryl-Si-Mg hybrid resin film)

In 200 g of ion-exchanged water was dissolved 1.96 g of nickel chloride 6-hydrate. To the solution was added 2.73 g of 3-methacryloxypropyl-trimethoxysilane diluted with 50 g of methanol. The solution was thoroughly stirred for 1 hour. To the solution was further added 16.5 ml of 1N aqueous solution of sodium hydroxide at a rate of 2 ml/min to form gel. After thorough stirring, the gel was filtered out and washed with water. Thus there was obtained the desired product in the form of a wet gel. To the gel was added 1000 ml of toluene with stirring. The gel dispersion was concentrated by means of a rotary evaporator to give a transparent swelling gel.

The swelling gel was applied to an acryl plate. Upon drying, there was obtained a clear film. This film is sticky and soft enough to be scratched by a fingernail. However, upon irradiation with ultraviolet rays for 1 hour by a high-pressure UV lamp, the film became stiff, which was found to have a pencil hardness (testing methods for paints, Japanese Industrial Standards, JIS K 5400/1990) higher than 9H.

Example 3

(Preparation of acryl-Mg hybrid clay)

In 200 g of ion-exchanged water was dissolved 1.68 g of magnesium chloride 6-hydrate. To the solution was added 2.73 g of 3-methacryloxy-propyltrimethoxysilane (MPTS) diluted with 50 g of methanol. The solution was thoroughly stirred for 1 hour. To the solution was further added 16.5 ml of 1N aqueous solution of sodium hydroxide at a rate of 2 ml/min to form a gel. The gel was allowed to stand at room temperature for 2 days. The gel was filtered out, washed with water and then with ethanol, and vacuum-dried. Thus there was obtained the desired acryl-Mg hybrid clay.

For a comparison a clay mineral was prepared from silicon alkoxide as follows: In 200 g of ion-exchanged water was dissolved 1.68 g of magnesium chloride 6-hydrate. To the solution was added 1.67 g of tetramethyl-orthosilicate (TMOS) diluted with 50 g of methanol. The solution was thoroughly stirred for 1 hour. To the solution was further added 16.5 ml of 1N aqueous solution of sodium hydroxide at a rate of 2 ml/min to form a gel. The gel was allowed to stand at room temperature for 2 days. The gel was filtered out, washed with water and then with ethanol, and vacuum-dried. Thus there was obtained the desired Mg-containing clay mineral (TMOS clay).

Figure 5:
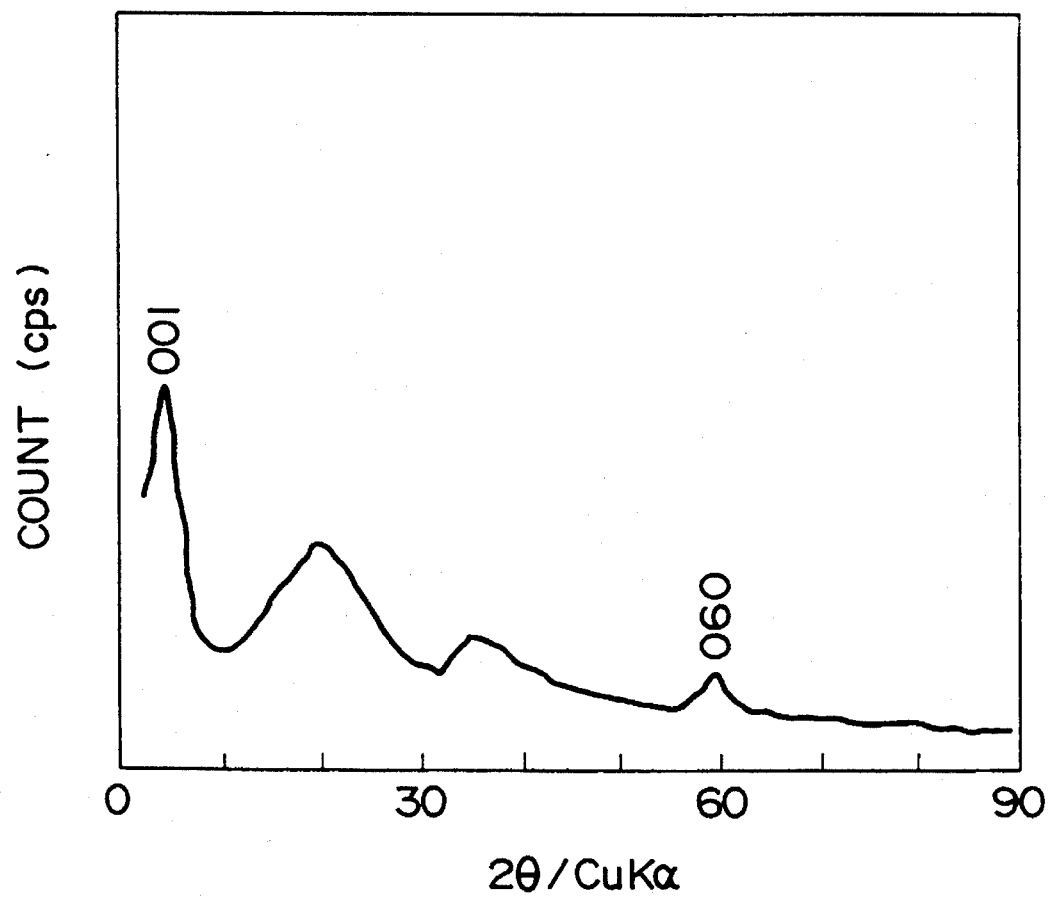
FIG. 5 is a graph showing an X-ray diffraction pattern of acryl-Mg hybrid clay.

The acryl-Mg hybrid clay was analyzed by X-ray diffractometry, the results of which are shown in FIG. 5. The pattern having the 001 peak is similar to that of smectite, which suggests the formation of a crystal structure.

Figure 6:
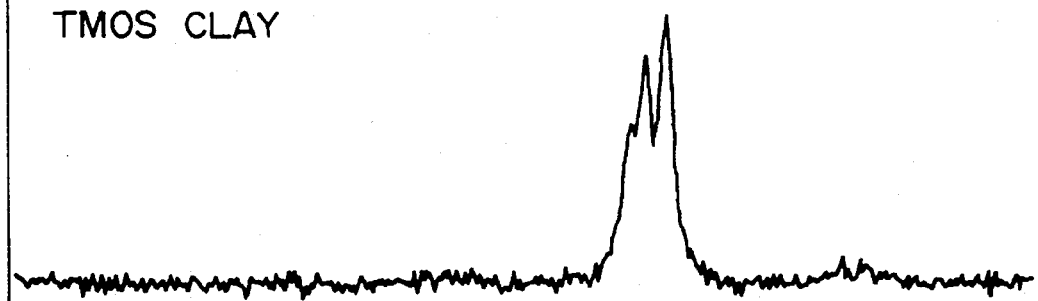
FIG. 6 is a diagram showing NMR spectra of Si in acryl-Mg hybrid clay and TMOS clay.
Figure 6:
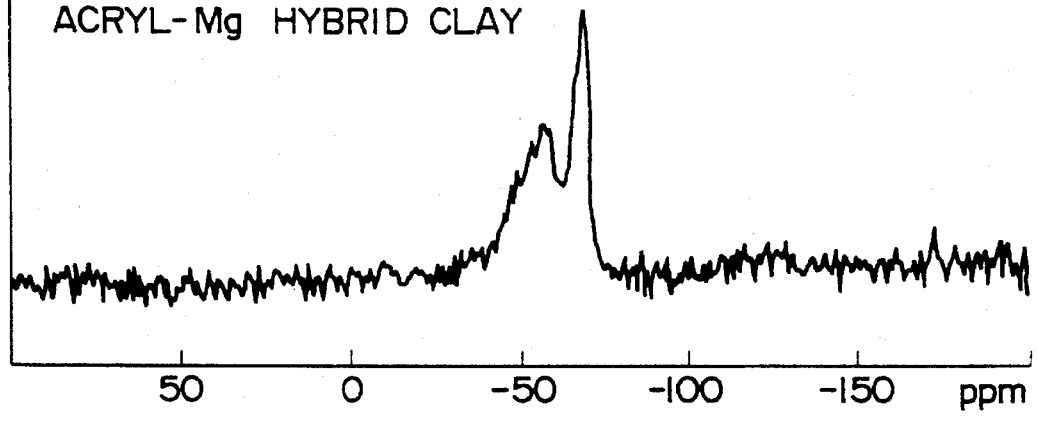

The acryl-Mg hybrid clay and TMOS clay were analyzed by $^{29}Si$ pulse NMR, the results of which are shown in FIG. 6. There are no broad peaks due to their amorphous structure. This suggests that they have a fairly high crystallinity.

For a reference, FIG. 6 also shows the NMR frequency shift of MPTS and TMOS. It is noted that the former is smaller than the latter, because TMOS has four Si—O bonds, whereas MPTS has one of the four Si—O bonds replaced by an Si—C bond. The foregoing relationship applies also to the acryl-Mg hybrid clay and the TMOS clay. This suggests that the Si atom in an acryl-Mg hybrid clay also has an Si—C bond.

Figure 7:
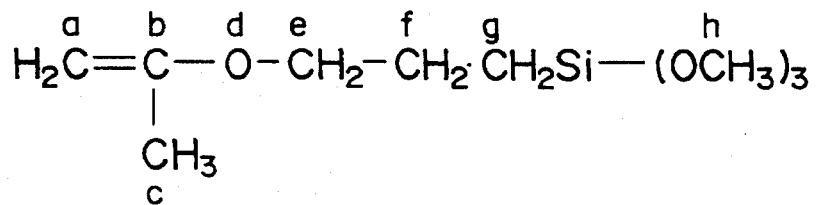
FIG. 7 is a diagram showing NMR spectra of C in acryl-Mg hybrid clay.
Figure 7:
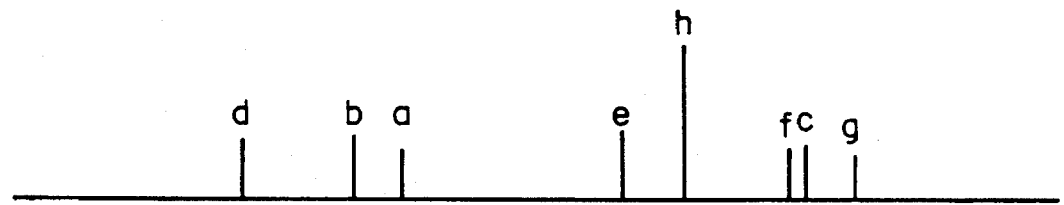
Figure 7:
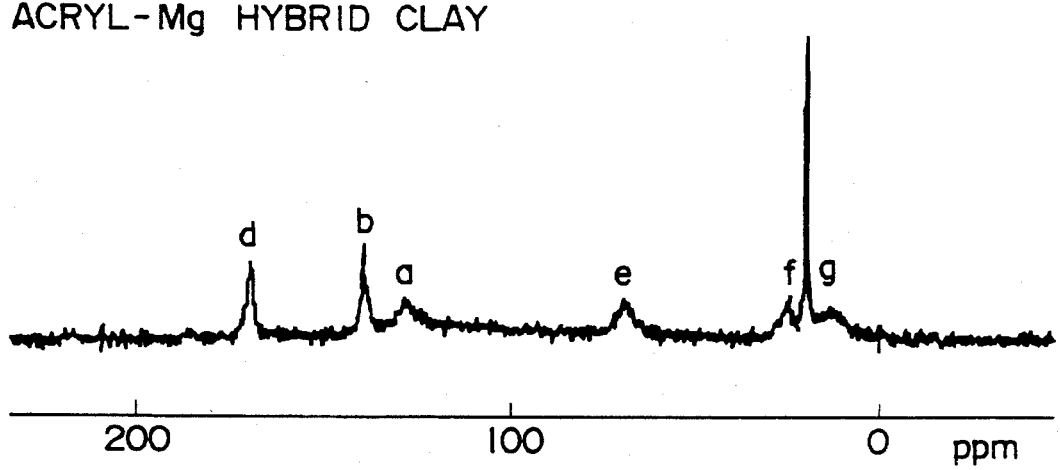

The acryl-Mg hybrid clay was analyzed by $^{13}C$ NMR, the results of which are shown in FIG. 7. For a reference, the data of MPTS are also shown. A comparison of these data indicates that the acryl-Mg hybrid clay has the organic structure bonded to the Si atom of MPTS.

Example 4

(Preparation of composite resin film composed of acryl-Mg hybrid clay and acrylic resin)

[Mixing step]

A dilute aqueous solution of sodium hydroxide (solution A) was prepared by diluting 200 ml of 1N aqueous solution of sodium hydroxide with 4000 ml of water. In 1000 ml of methanol were dissolved with thorough stirring 49.6 g of 3-methacryloxypropyltrimethoxysilane (MPTS) and 20.4 g of magnesium chloride 6-hydrate. The resulting solution is designated as solution B.

[Step for forming the layered polymer]

Solution A was added to solution B with stirring to bring about gelation. The gel has a crystalline layered structure in which one or two sheets of tetrahedrons (with the central atom being Si) and a sheet of octahedrons (with the central atom being Mg) are laminated to form a layered clay-like structure. The gel was filtered out, washed with water, and vacuum-dried into powder. This layered polymer has an organic group whose active group (methacrylic acid) is covalently bonded through a propyl group to Si which is the central atom of the sheets of tetrahedrons.

[Bonding step]

The thus obtained layered polymer (1 g) was incorporated with 2 g of 2-hydroxyethylmethacrylate (HEMA) and 0.03 g of benzoylisopropylether (as a photopolymerization initiator) by stirring. The mixture was applied to an acryl plate to form a coating film of different thickness (100 μm and 500 μm (0.5 mm)). For polymerization, the coating film was irradiated with ultraviolet rays for 1 hour by a high-pressure UV lamp. Thus there was formed on the acryl plate a coating film of an organosilicic polymer resulting from the bonding of HEMA and methacrylic acid residue. Both of the coating films were found to have a pencil hardness of 6H. This hardness is higher than that (lower than 6 B) of the homopolymer of HEMA. This result suggests that the organosilicic polymer improves the surface hardness of an organic polymer. Incidentally, the layered polymer in this example permits a thicker coating (up to 500 μm) compared with the conventional L/V-curable hard coating material (thinner than 50 μm).

Example 5

(Preparation of composite resin film composed of acryl-Mg hybrid clay and acrylic resin)

The layered polymer (2 g) prepared in Example 1 was incorporated with 5 g of methylmethacrylate (MMA) and 0.07 g of benzoylisopropylether as a photopolymerization initiator by stirring. The mixture was applied to an acryl plate to form a 100 μm thick coating film. For polymerization, the coating film was irradiated with ultraviolet rays for 1 hour by a high-pressure UV lamp. Thus there was formed on the acryl plate a coating film of organosilicic polymer resulting from the bonding of MMA and acrylic acid residue. The coating film was found to have a pencil hardness of 9H. This hardness is higher than that (6 B) of the polymer of MMA.

Example 6

(Preparation of composite resin film composed of acryl-Mg hybrid clay and acrylic resin)

The layered polymer prepared in Example 1 was mixed with HEMA in different ratios of 0.05, 0.5, 1, 3, 6.5, 12.5, 25, 50, 75, and 85 wt %. Each mixture was incorporated with 1 wt % of benzoylisopropylether as a photo-polymerization initiator. The mixture was cast into a mold, measuring 20×10×and 1 mm, followed by irradiation with ultraviolet rays for 1 hour by a high-pressure UV lamp. The resulting plate samples were tested for dynamic viscoelastic properties by DMA, and their glass transition temperature was determined from the peak of the loss modulus (E"). The results are shown in FIG. 8 and Table 1.

TABLE 1

| Content of layered polymer (%) | 0 | 0.05 | 0.5 | 1.0 | 3.0 | 6.5 |
|---|---|---|---|---|---|---|
| Glass transition temperature (°C.) | 90.7 | 94.2 | 94.0 | 97.2 | 98.1 | 101.2 |
| Content of layered polymer (%) | 12.5 | 25.0 | 50.0 | 75.0 | 85.0 | — |
| Glass transition temperature (°C.) | 102.2 | 105.3 | 105.9 | x | x | — |

Table 1 shows the relationship between the content of the layered polymer-in the HEMA polymer and the glass transition temperature. It is noted from Table 1 that when the layered polymer is added in an amount of 0.05 wt %, the resulting organosilicic polymer has a glass transition temperature which is about 4° C. higher than that of HEMA homopolymer. It is also noted that the glass transition temperature of the organosilicic polymer rises with the increasing amount of the layered polymer added to HEMA. With an amount of 50 wt %, the glass transition temperature is 15° C. higher than that of HEMA homopolymer. With an amount in excess of 75 wt %, the organosilicic polymer does not have any glass transition temperature. This suggests that the polymer exhibits pronounced inorganic properties.

FIG. 8 is a graphical representation of the data shown in Table 1. It indicates that the glass transition temperature steeply rises with a small amount of layered polymer added. The relationship between the glass transition temperature (y) and the layered polymer content (x) is expressed by the following expression.

$$y = 96.752 + 5.3755 \log x$$

This suggests that reactions take place between the layered polymer and HEMA at the time of photopolymerization. It was found that the layered polymer in as small an amount as 0.05 wt % is effective in improving the heat resistance of the HEMA polymer.

What is claimed is:

1. A layered inorganic-organic polymer, which comprises: one or two sheets of tetrahedrons, with its central atom being at least one metal selected from the group consisting of Si, Al, Fe, Ge and P, wherein at least a portion of the central atoms have organic groups bonded thereto said organic groups containing functional groups; and a sheet of octahedrons, with the central atoms thereof being at least one metal selected from the group consisting of Mg, Al, Ni, Co, Cu, Mn, Fe, Li, V and Zr, said sheets of tetrahedrons and octahedrons being joined to form a layered structure.

2. A layered inorganic-organic polymer as defined in claim 1, wherein the sheet of said octahedrons is sandwiched between the sheets of said tetrahedrons.

3. A layered inorganic-organic polymer as defined in claim 1, wherein one sheet of said octahedrons and one sheet of said tetrahedrons are arranged back to back.

4. A shaped article of the layered inorganic-organic polymer of claim 1, prepared by shaping the layered polymer into a desired form and completing bonding within one layered inorganic-organic polymer by reaction between functional groups thereof.

5. A process for producing a layered inorganic-organic polymer of claim 1, comprising:

dissolving or dispersing components (a) and (b), and optionally components (c) and/or (d), in component (e); and raising the pH of a resulting solution to cause crystallization of the layered inorganic-organic polymer;

said component (a) being at least one compound selected from the group consisting of:

Si compounds containing Si having at least one alkoxyl group and at least one organic group containing a functional group covalently bonded to the Si; and Ge compounds containing Ge having at least one alkoxyl group or halogen and at least one organic group containing a functional group covalently bonded to the Ge;

said component (b) being at least one compound selected from the group consisting of inorganic salts, organic salts, and alkoxides of at least one metal selected from the group consisting of Mg, Al, Ni, Co, Cu, Mn, Fe, Li, V and Zr;

said component (c) being at least one compound selected from the group consisting of silicon alkoxides having at least one alkoxyl group, germanium alkoxides having at least one alkoxyl group, and germanium halides;

said component (d) being at least one compound containing P; and said component (e) being at least one solvent selected from the group consisting of inorganic and organic polar solvents.

6. A process as defined in claim 5, wherein the pH of said resulting solution is 8-10.

7. A shaped article of the layered inorganic-organic polymer of claim 1, prepared by shaping the layered polymer into a desired form and completing bonding of one layered inorganic-organic polymer to another layered inorganic-organic polymer by intermolecular bonding.

8. A shaped article of the layered inorganic-organic polymer of claim 1, prepared by shaping the layered polymer into a desired form and the layers of the shaped polymer are bonded to a first organic compound by bonding between functional groups on the organic groups of the layered polymer and functional groups on the organic compound.

9. A shaped article as defined in claim 4, wherein said functional group is selected from the group consisting of an unsaturated bond, and a pair of amino and carboxyl groups.

10. The shaped article of claim 8, wherein the organic compound bonded to the organic groups of one layered inorganic-organic polymer is bonded to the organic groups of another layered inorganic-organic polymer.

11. The shaped article of claim 8, wherein, prior to shaping, the layered inorganic-organic polymer is mixed with, or dispersed in, a second organic compound as a matrix.

12. The shaped article of claim 8, wherein the functional group on the organic group of the layered polymer is a vinyl group, and acryl or a methacryl group; and the functional group attached to the first organic compound is a vinyl group, an acryl group, or a methacryl group, or said functional group is obtained by polymerization of the functional groups.

13. The shaped article of claim 8, wherein the functional group on the organic group of the layered inorganic-organic polymer is an amino group, a mercapto group or a p-hydroxy phenyl group; and the functional group on the first organic compound is a carboxyl group, or a epoxy group, or a functional group obtained by polymerization of these groups.

14. The shaped article of claim 8, wherein the functional group on the organic group of the layered inorganic-organic polymer is an epoxy group and the functional group of the first organic compound is an epoxy group, an amino group, or a carboxyl group, or the organic compound as one which has a terminal hydroxyl group, or organic compound obtained by polymerization thereof.

15. A process for producing a shaped article as defined in claim 4 of a layered inorganic-organic polymer, comprising:

dissolving or dispersing components (a) and (b), and optionally components (c) and/or (d) in a component (e); raising the pH of the resulting solution to cause crystallization of the layered inorganic-organic polymer;

said component (a) being at least one compound selected from the group consisting of:
Si compounds containing Si having at least one alkoxyl group and at least one organic group covalently bonded to the Si, said at least one organic group having a functional group thereon; and
Ge compounds containing Ge having at least alkoxyl group or halogen and an organic group covalently bonded to the Ge, said at least one organic group having a functional group;

said component (b) being at least one compound selected from the group consisting of inorganic salts, organic salts and alkoxides of at least one metal selected from the group consisting of Mg, Al, Ni, Co, Cu, Mn, Fe, Li, V and Zr;

said component (c) being at least one compound selected from the group consisting of silicon alkoxides having at least one alkoxyl group, germanium alkoxides having at least one alkoxyl group, and germanium halides;

said component (d) being at least one compound containing P; and said component (e) being at least one solvent selected from the group consisting of inorganic and organic polar solvents.

16. The process of claim 9, wherein the layered inorganic-organic polymer is shaped into a film.

17. A process for producing the shaped article of a layered inorganic-organic polymer of claim 8, comprising:

dissolving or dispersing components (a) and (b), and optionally components (c), and/or (d), in a component (e) and raising the pH of the solution to cause crystallization of the layered inorganic-organic polymer;

mixing the layered inorganic-organic polymer with the first organic compound, and bonding the functional groups of the first organic compound with the functional groups of the organic groups of the layered inorganic-organic polymer;

said component (a) being at least one compound selected from the group consisting of:
Si compounds containing Si having at least one alkoxyl compound and at least one organic group covalently bonded to the Si, said at least one organic group having a functional group thereon; and
Ge compounds containing Ge having at least alkoxyl group or halogen and an organic group covalently bonded to the Ge, said at least one organic group having a functional group;

said component (b) being at least one compound selected from the group consisting of inorganic salts, organic salts and alkoxides of at least one metal selected from the group consisting of Mg, Al, Ni, Co, Cu, Mn, Fe, Li, V and Zr;

said component (c) being at least one compound selected from the group consisting of silicon alkoxides having at least one alkoxyl group, germanium alkoxides having at least one alkoxyl group, and germanium halides;

said component (d) being at least one compound containing P; and said component (e) being at least one solvent selected from the group consisting of inorganic and organic polar solvents.

18. A layered inorganic-organic polymer, which comprises:

one or two sheets of tetrahedrons, with its central atom being at least one metal selected from the group consisting of Si, Al, Fe, Ge, and P, wherein at least a portion of the central atoms have organic groups bonded thereto; and a sheet of octahedrons, with the central atoms thereof being at least one metal selected from the group consisting of Mg, Al, Ni, Co, Cu, Mn, Fe, Li, V and Zr, said sheets of tetrahedrons and octahedrons being joined to form a layered structure.

* * * * *